Aug. 6, 1940.　　　R. C. MERCER　　　2,210,422
FILM MEASURING RULE OR GAUGE
Filed Feb. 25, 1938
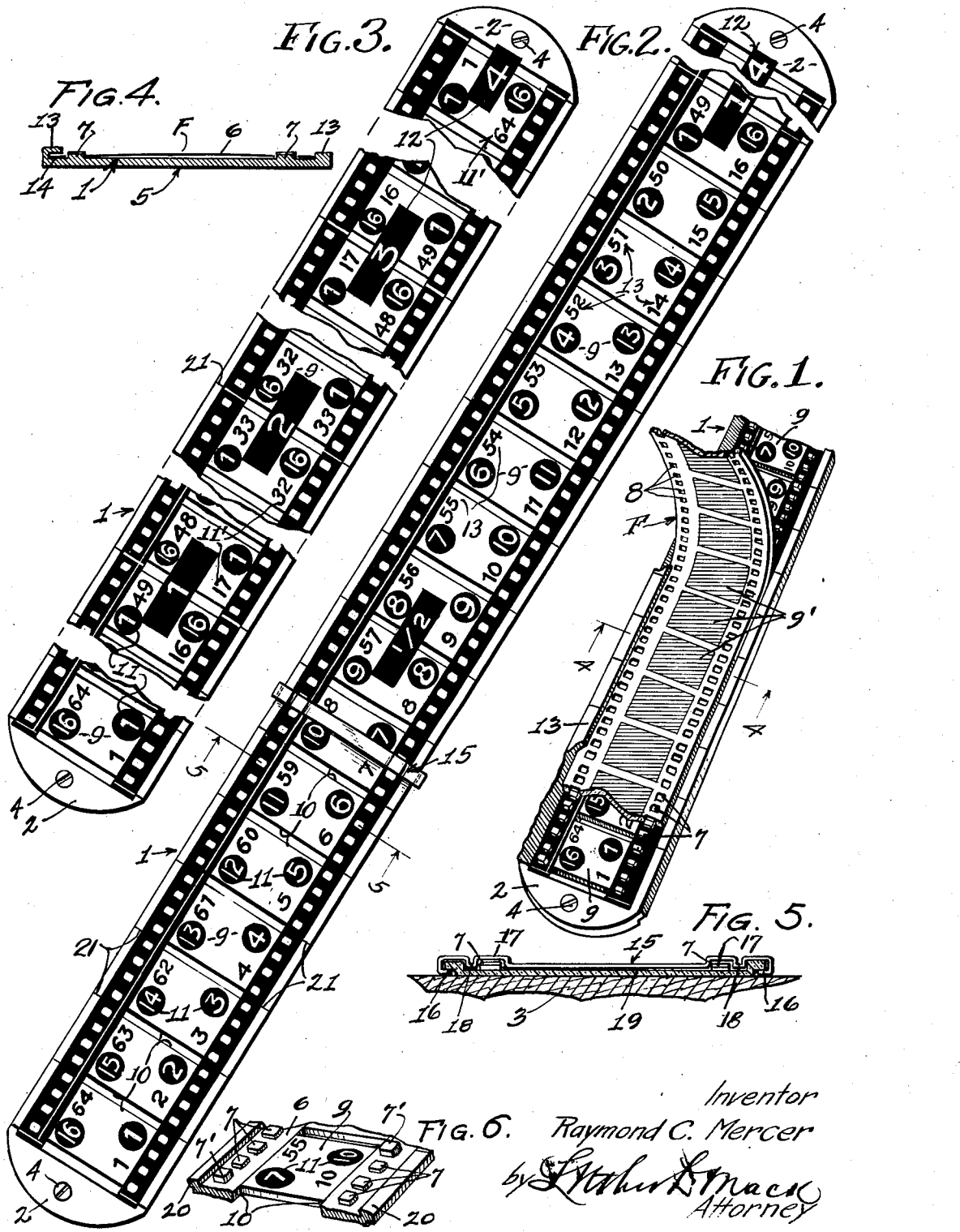
Inventor
Raymond C. Mercer
by Arthur L. Mack
Attorney Patented Aug. 6, 1940

2,210,422

UNITED STATES PATENT OFFICE 2,210,422

FILM MEASURING RULE OR GAUGE

Raymond C. Mercer, Los Angeles, Calif.

Application February 25, 1938, Serial No. 192,528

5 Claims. (Cl. 33—111)

This invention relates to and has for an object the provision of a rule or gauge for measuring motion picture films, particularly short sections thereof, either with or without sound recordings thereon, whereby sections of film, when laid upon said rule or gauge, may be accurately measured and positioned with respect to certain portions thereof, in order to insert and connect film sections between other sections for producing special effects, as well as for other purposes which may be explained hereinafter or which may be desirable for the purposes stated.

A rule or gauge such as is contemplated by my invention, may partake of the following or other characteristics. Generally I prefer to provide a rule or gauge formed of a single strip of material of glass, Celluloid or metal, said strip being either partially or wholly transparent, translucent or light transmitting, as when glass, Celluloid or the like is employed, or provided with light transmitting apertures as when metal is used, so that when being used in a measuring operation and the strip of material is positioned upon a table or other supporting surface provided with a light below the supporting surface, light may be transmitted through the rule or gauge upon or through the superposed film for the purpose of aiding in the positioning and measuring of the film.

A particular feature of my improved rule or gauge consists in the provision on a face thereof of one or more series of raised or embossed graduations uniformly spaced longitudinally (and laterally when more than one series is used) and having the general form and corresponding in their spacing to the sprocket perforations on standard motion picture films, whereby when a film is superposed on the rule and the raised graduations are engaged with the sprocket perforations of the film, the film will be prevented from accidental displacement from a desired position on the rule while calculations or measurements are being made.

A further feature of my invention is the provision of a substantially elongated rule, for example, from two feet to four feet in length, which is capable of being laid flatwise upon a supporting surface and which has on a face thereof a plurality of uniformly sized and spaced areas corresponding to the so-called "frames" of a motion picture film, together with suitable numerals, characters and graduations either on or adjacent to said areas for consecutively numbering the areas in both directions from end to end of said rule; one set of said numerals being continuous throughout the length of the rule and another or other sets of numerals being continuous only for each foot of the length of the rule.

A still further object is to provide in a rule of the character described, means for holding a film in a selected position on the rule during a measuring operation, said means being either adjustable or fixed as may be desirable.

Another object of the invention is to provide means formed on the rule in the form of graduations, or otherwise, for justifying and synchronizing the sound track or record of a modern talking picture film with the requisite frames of the pictures, in order to permit deletion or addition of short sections from or to a film record, respectively.

Other objects may appear as the description progresses.

I have shown a preferred form of my invention, together with certain minor but desirable modifications in the accompanying drawing, subject, however, to further modifications within the scope of the appended claims, without departing from the spirit of my invention.

In said drawing:

Fig. 1 is a fragmentary perspective view of my improved rule or gauge, with a section of film superposed thereon and one means of holding a film on the rule;

Fig. 2 is a top view with a complete foot of the length thereof fully shown and the remainder of its length broken away; and showing another means for holding the film in a selected position;

Fig. 3 is a fragmentary top view of the rule or gauge broken away at a plurality of points, so as to illustrate features of the rule not shown in Fig. 1;

Fig. 4 is a cross sectional view of the rule or gauge as seen on line 4—4 of Fig. 1;

Fig. 5 is a section of the same on line 5—5 of Fig. 2;

Fig. 6 is a fragmentary perspective view of a slightly modified form of rule.

As hereinbefore mentioned, my rule may be made of a strip of metal, Celluloid or glass so as to provide certain transparent, translucent or light transmitting portions. As for instance, as shown in Figs. 1, 2 and 3, when the rule is made of glass or Celluloid, it may have opaque and clear or translucent areas, as indicated, respectively, by the dark and light portions of the rule, but when the rule is made of metal, apertures may be provided at desired locations, as between the frame supporting portions, through which light from below the rule may be transmitted to and upon the superposed films, as shown in Fig. 6.

Preferredly the rule or gauge is formed of a single long and narrow strip of material 1 having end extensions 2, 2 and adapted to be held immovably upon a suitable supporting surface 3 as by means of screws 4, or otherwise. The strip 1 is of generally rectangular cross section with a flat bottom 5 and a top 6 which likewise is flat and adapted to receive a section, or sections of motion picture film F.

At one or both sides of the top 6 I provide longitudinally spaced bosses, lugs or the like 7, 7, correspondingly spaced relative to the sprocket perforations 8 of a film and raised just sufficiently above the top 6 to engage in said perforations and hold the film normally against displacement from a selected position on the rule. Certain of said bosses, as for instance the ones 7', at uniformly spaced positions, may be of slightly greater height than the other bosses 7 so as to insure against the accidental displacement of the film F when it has been set at a desired position on the rule. Thus the bosses 7 and 7' are in effect graduations which register with the sprocket perforations on the film and assist in the accurate placement of the film on the rule.

The central portion of the top 6 is subdivided into areas 9, 9, etc., which correspond substantially in size, form and spacing to the "frames" of a motion picture film F and have the same relation to the bosses 7 and 7' as do the frames 9' of film F to its perforations 8. Said areas 9 may be transparent or translucent, or only partially so, so as to transmit light from below the rule to the film F thereon. Or the spaces 10, 10, etc., between the areas 9, 9, etc., may be of light transmitting character, i. e., transparent, translucent, or actually defining slots in the body of the rule so as to pass light therethrough.

It will be observed that the areas 9 have groups of numerals provided thereon for the purpose of indicating the respective positions of the areas in each foot of the rule and also between the ends of the rule. There being sixteen frames to each foot of film, there are likewise, a corresponding number of the areas 9 in each foot of the rule, and these areas are indicated by the numerals 11 which are enclosed as by means of dark circular areas, or otherwise; one set of such numerals reading in one direction and the other set in an opposite direction from each foot indication 12 on the face of the rule midway between the edges thereof. The numerical indications 11, 11 are divided into two groups, arranged at opposite sides of the areas 9.

Other indicating numerals 13 are likewise arranged in oppositely directed consecutive order near the sides of the areas 9 and continue in consecutive order from each end of the rule to the other end, as for example, from 1 to 64. These numerals enable a quick measurement as to number of frames past 16. For example, if a strip of film 24 frames long is to be taken out or spliced in, the numerals 13 afford a quicker measurement for this unit of length than the sets of numerals 11 which only run up to 16.

As shown in Fig. 1, one edge 13 of the rule 1 is turned inwardly over the top 6 so as to provide a shallow groove or channel 14 which is adapted to receive and hold a corresponding margin of the film when the film is superposed on the rule, thereby serving to prevent the accidental slipping or displacement of the film from the rule under ordinary conditions during a measuring operation.

A modified form of film holding means is shown in Fig. 2 which embodies a slidable band or clip 15 so formed that its ends 16 will underlie the edges of the rule 1, its upper marginal portions 17 will clear the bosses 7 and 7', and the intermediate portions 18 and 19 will lightly engage the upper surface of the film F for preventing its displacement from the rule. Said band or clip is frictionally engaged with the body of the rule so that it will remain wherever it may be positioned and yet may be readily moved lengthwise of the rule or entirely removed therefrom or replaced at will. Only a single clip 15 is necessary for a rule as the same may be moved into such a position that it will engage an end or an intermediate portion of the film and will serve to hold the film sprocket perforations engaged with the bosses 7 and 7' on the rule.

Figs. 2, 3 and 6, show a form of rule whereby the film F is held against displacement from the rule by means of ribs 20, 20, near the margins of the rule which are spaced transversely to correspond substantially to the width of film F, so that the edges of the film will frictionally engage the inner sides of ribs 20 in addition to their engagement with the bosses 7 and 7'.

It is well known that the sound record on a motion picture film does not register with the corresponding frames of the picture of the film, there being approximately a lag of about twenty frames as between the sound record and the picture, hence, I have provided near the margins of the rule 1, outside of the portion adapted to be occupied by the film, a series of graduations 21, 21, on one or both margins, which may be designated by suitable numerals or characters differing from the numerals 11 and 11' but preferably spaced to correspond to the frame positions on the rule. Thus a film with a sound record may be so positioned on the rule, or sections thereof, that additions may be inserted between two or more sections, with regard to the sound record as well as to the picture continuity.

In operation, a section of film F, or two or more sections of a film, may be superposed on the rule 1 in selected position for deleting portions thereof, or for adding portions to or between sections of film, the section or sections of the film being positioned on the rule by measurement and calculation so as to provide the requisite number of frames between the sections for addition of another or other sections of film or for deleting or otherwise modifying the film to meet the conditions desired for certain special effects. In either case the film sections are held by one of the means shown and described herein against displacement during the measuring and calculating operations, and may thereafter be readily removed from the rule.

It will be apparent that the numerical indications and graduations on the rule will substantially expedite the measurement of the film and desired operations for producing whatever effect may be desired.

As an additional means of holding the film F immovable on the rule or gauge 1, I may occasionally intermittently or uniformly omit certain of the bosses or lugs 7 (see Fig. 6) and in lieu thereof, provide perforations which correspond to the sprocket perforations so that film patches of the character described in Letters Patent No. 1,389,523 dated August 30, 1921, may be employed for holding the film in position on the rule or gauge 1.

By reference to said patent, it will be noted that said patches have teeth which are adapted to project thru the sprocket perforations of the films for the purpose of attaching separate sections of the film together. Hence, it is possible to extend the teeth of the patches, as shown in said patent, thru perforations in the rule or gauge and thereafter to bend the teeth over under the bottom 5, so that the film may not be displaced from a selected position on the rule or gauge.

I am aware of the fact that film measuring devices for films have heretofore been used but such well known devices have embodied a reel on which the film is wound and means for measuring the film as it is wound on or unwound from said reel.

I claim:

1. A rule or the like for measuring motion picture films comprising a strip of material having longitudinally spaced areas on a side thereof corresponding to frames of a motion picture film, means near a margin of said strip for engagement in the procket perforations of a film, and means adjustable longitudinally on said strip to positions for holding a film engaged with said last mentioned means.

2. A rule or the like for measuring motion picture films, comprising a strip of flat material provided on its upper side with raised graduations spaced and formed to engage in the sprocket perforations of a film and light transmitting areas inwardly of said graduations, and means for holding a film on said strip against accidental displacement during a measuring operation, and indicia on said strip for indicating subdivisions of feet and of the length of said strip in frames, said indicia including markings progressing in sequence in opposite directions.

3. A rule or the like for measuring motion picture film comprising: a strip of material of generally flat cross section having a reverse side adapted to engage a supporting surface and an obverse side formed with longitudinal elements spaced apart transversely to correspond to the width of a film and between which said film is adapted to be disposed in a measuring operation and also provided with raised graduations substantially conforming in their spacing and size to the sprocket perforations of said film and extending throughout the length of said strip, said obverse side also having longitudinally spaced areas which in their spacing and size correspond to and are adapted to register with the frames of said film, and designations on said obverse side for consecutively numbering said areas longitudinally of said strip.

4. A rule or the like for measuring motion picture film comprising: a strip of material of generally flat cross section having a reverse side adapted to engage a supporting surface and an obverse side formed with longitudinal ribs spaced apart transversely to correspond to the width of a film and between which said film is adapted to be disposed in a measuring operation and also provided with raised graduations substantially conforming in their spacing and size to the sprocket perforations of said film and extending throughout the length of said strip, said obverse side also having longitudinally spaced areas which in their spacing and size correspond to and are adapted to register with the frames of said film, and designations on said obverse side for consecutively numbering said areas longitudinally of said strip, the portions of said strip surrounding said graduations and said areas being of slightly less thickness than said graduations and areas.

5. A rule or the like for measuring motion picture film comprising: a strip of material of generally flat cross section having a reverse side adapted to engage a supporting surface and an obverse side formed with longitudinal elements spaced apart transversely to correspond to the width of a film and between which said film is adapted to be disposed in a measuring operation and also provided with raised graduations substantially conforming in their spacing and size to the sprocket perforations of said film and extending throughout the length of said strip, said obverse side also having longitudinally spaced areas which in their spacing and size correspond to and are adapted to register with the frames of said film, and designations on said obverse side for consecutively numbering said areas longitudinally of said strip, and attaching portions on said strip whereby the strip may be immovably held on a supporting surface.

RAYMOND C. MERCER.